United States Patent
Marley (10) Patent No.: US 8,544,221 B2
(45) Date of Patent: Oct. 1, 2013

(54) ADJUSTABLE RACKING SYSTEM FOR SOLAR ARRAY AND METHOD OF CONSTRUCTION OF A SOLAR ARRAY

(75) Inventor: James David Marley, Belchertown, MA (US)

(73) Assignee: Hyperion Systems LLC, Amherst, MA (US)

( * ) Notice: Subject to any disclaimer, the term of this patent is extended or adjusted under 35 U.S.C. 154(b) by 0 days.

(21) Appl. No.: 13/172,257

(22) Filed: Jun. 29, 2011

(65) Prior Publication Data

US 2012/0074079 A1    Mar. 29, 2012

Related U.S. Application Data

(60) Provisional application No. 61/385,686, filed on Sep. 23, 2010.

(51) Int. Cl.
*E04B 1/38*    (2006.01)

(52) U.S. Cl.
USPC ......... 52/173.3; 52/712; 248/228.1; 403/399; 126/608; 136/244

(58) Field of Classification Search
USPC ............... 52/173.3, 582.1, 584.1, 586.1, 712; 248/58, 62, 228.1, 226.1; 403/398, 399; 136/244; 126/608
See application file for complete search history.

(56) References Cited

U.S. PATENT DOCUMENTS 1,787,167 A * 12/1930 Purdy .............................. 403/58
3,596,941 A *  8/1971 Tracy ............................. 403/27
4,148,164 A *  4/1979 Humphrey ......................... 52/94
4,152,174 A    5/1979 Ludlow ....................... 136/89 PC
4,652,890 A *  3/1987 Crean ........................... 343/882
4,832,001 A    5/1989 Baer ............................. 126/425

(Continued)

FOREIGN PATENT DOCUMENTS

| CA | 2004980 | 6/1990 |
| DE | 36 43 487 A1 | 6/1988 |
| WO | WO 2009/039556 A1 | 4/2009 |
| WO | WO 2010/054831 A2 | 5/2010 |

OTHER PUBLICATIONS

Denholm, P. , et al., "Impacts of Array Configuration on Land-Use Requirements for Large-Scale Photovoltaic Deployment in the United States," *National Renewable Energy Laboratory*, 7 pages, May 2008.

(Continued)

*Primary Examiner* — Robert Canfield
*Assistant Examiner* — Brent W Herring
(74) *Attorney, Agent, or Firm* — Sunstein Kann Murphy & Timbers LLP (57) ABSTRACT

A structure for supporting an array of solar panels above a surface comprises finned poles, a horizontal spline, and a number of movable yokes coupling each of the solar panels to the spline, such that the solar panels may be secured to the spline, and later repositioned along the spline and re-secured to the spline. A pole includes one or more fins in a central portion, to stabilize the pole when set into the ground. The cross-section of the spline may take a variety of shapes, including quadrilateral shapes and conic sections. Constructing a solar array involves using commonplace, readily accessible materials, and construction equipment and methods with low-environmental-impact, all to produce an attractive, easy to construct environmentally friendly installation.

8 Claims, 10 Drawing Sheets

(56) References Cited

U.S. PATENT DOCUMENTS

| | | | | |
|---|---|---|---|---|
| 5,101,593 | A | 4/1992 | Bhatt | 47/17 |
| 5,143,556 | A | 9/1992 | Matlin | 136/244 |
| 5,228,924 | A * | 7/1993 | Barker et al. | 136/246 |
| 5,295,646 | A * | 3/1994 | Roth | 248/58 |
| 6,201,181 | B1 * | 3/2001 | Azzam et al. | 136/244 |
| 6,240,682 | B1 * | 6/2001 | James et al. | 52/90.2 |
| 6,302,099 | B1 | 10/2001 | McDermott | 126/600 |
| 6,357,712 | B1 * | 3/2002 | Lu | 248/291.1 |
| 6,370,828 | B1 * | 4/2002 | Genschorek | 52/200 |
| 6,722,357 | B2 * | 4/2004 | Shingleton | 126/600 |
| 7,285,719 | B2 | 10/2007 | Conger | 136/245 |
| 7,388,146 | B2 | 6/2008 | Fraas et al. | 136/246 |
| 7,557,292 | B2 * | 7/2009 | Shingleton et al. | 136/246 |
| 7,807,918 | B2 * | 10/2010 | Shingleton et al. | 136/243 |
| 7,888,587 | B2 * | 2/2011 | Shingleton et al. | 136/246 |
| 7,918,054 | B2 * | 4/2011 | Grafton et al. | 52/92.3 |
| 8,191,336 | B2 * | 6/2012 | Roberts et al. | 52/749.1 |
| 2004/0261955 | A1 | 12/2004 | Shingleton et al. | 160/84.06 |
| 2007/0199560 | A1 | 8/2007 | Hobbs et al. | 126/600 |
| 2008/0053517 | A1 * | 3/2008 | Plaisted et al. | 136/251 |
| 2008/0230108 | A1 | 9/2008 | Keshner et al. | 136/244 |
| 2008/0302928 | A1 * | 12/2008 | Haddock | 248/205.1 |
| 2008/0308091 | A1 * | 12/2008 | Corio | 126/606 |
| 2009/0166494 | A1 | 7/2009 | Bartelt-Muszynski et al. | 248/237 |
| 2010/0089389 | A1 | 4/2010 | Seery et al. | 126/608 |
| 2010/0089433 | A1 | 4/2010 | Conger | 136/244 |
| 2010/0139649 | A1 | 6/2010 | Almy et al. | 126/704 |
| 2010/0276558 | A1 * | 11/2010 | Faust et al. | 248/222.14 |
| 2012/0073219 | A1 * | 3/2012 | Zuritis | 52/173.3 |
| 2012/0090665 | A1 * | 4/2012 | Zuritis | 136/251 |

OTHER PUBLICATIONS

Unirac, "Unirac Large Array (U-LA) Megawatts of Experience," www.unirac.com, 16 pages; 2008.

Matthew Hirsch, "Making the Desert Bloom—Nevada Has a Grand Plan: Energize its Own Grid and Send the Surplus to California," Issue 1, *Photon*, pp. 72-83, Jan. 2011.

Authorized Officer: Blaine R. Copenheaver, Notification of Transmittal of the International Search Report and the Written Opinion of the International Searching Authority, or the Declaration; PCT/US2011/052520, Feb. 23, 2012.

Thomas J. Tuytschaevers, Amendment of Claims Under PCT Article 19 as filed with the Int'l Bureau of WIPO in PCT/US2011/052520; Apr. 23, 2012, 10 pages.

* cited by examiner

| Pole No. | Pipe Outside Diameter (in.) | Fins | Fin Location | Gross Ultimate Uplift Load (lbs) |
|---|---|---|---|---|
| 1 | 4.5 | - | - | 4100 |
| 2 | 4.5 | 4 @ 6 in. x 36 in. | Bottom | 5500 |
| 3 | 4.5 | 4 @ 6 in. x 36 in. | Top | 6500 |
| 4 | 4.5 | 4 @ 6 in. x 48 in. | Bottom | 4600 |
| 5 | 4.5 | 4 @ 6 in. x 48 in. | Top | 5800 |
| 6 | 6.625 | - | - | 4100 |
| 7 | 6.625 | 4 @ 6 in. x 36 in. | Bottom | 5200 |
| 8 | 6.625 | 4 @ 6 in. x 36 in. | Top | 8000 |
| 9 | 6.625 | 4 @ 6 in. x 48 in. | Bottom | 8200 |
| 10 | 6.625 | 4 @ 6 in. x 48 in. | Top | 8100 |
| 11 | 8.625 | - | - | 3700 |
| 12* | 8.625 | 4 @ 6 in. x 36 in. | Bottom | 2700 |
| 13 | 8.625 | 4 @ 6 in. x 36 in. | Top | 5500 |
| 14* | 8.625 | 4 @ 8 in. x 48 in. | Bottom | 6100 |
| 15 | 8.625 | 4 @ 8 in. x 48 in. | Top | 7500 |

Note: * Poles tipped to west

Fig. 2E

Fig. 3A
Front View

Side View
Fig. 3B

Top View
Fig. 3C

Side View

Fig. 5A

Front View

Fig. 5B

Top View

ADJUSTABLE RACKING SYSTEM FOR SOLAR ARRAY AND METHOD OF CONSTRUCTION OF A SOLAR ARRAY

PRIORITY

This patent application claims priority from provisional U.S. patent application No. 61/385,686, filed Sep. 23, 2010, entitled, "Adjustable Racking System for Solar Array," and naming James David Marley as inventor [practitioner's file 3604/101], the disclosure of which is incorporated herein, in its entirety, by reference.

TECHNICAL FIELD

The present invention relates to photovoltaic panel arrays, and more particularly to structures and methods for mounting photovoltaic panels.

BACKGROUND ART

Photovoltaic panels (which may be known as "solar panels," each of which may include one or more photovoltaic cells or "solar cells") are typically mounted on structures and oriented to facilitate their maximum exposure to sunlight.

Such panels are typically arranged to efficiently absorb available sunlight. To that end, some panel mounting systems may allow the panel to pivot up or down, or left to right, to track the sunlight. Aside from an ability to pivot in place, however, the location of a panel is stationary relative to the ground, building or other structure on which the mounting structure is based. Such fixed mounting limits the utility of the panel. For example, such fixed mounting may limit the potential for maximum absorption of sunlight.

Mounting structures may be located on the ground, or may be attached to buildings or other structures. However, the space constraints of building-mounted make such structures difficult and expensive to install, in part because of their location. Delivering the components of a solar panel and its support structure to a mounting location atop a building can be both expensive and dangerous. The cost of delivering the materials may include heavy lifting equipment, for example, and require specialized construction skills. In addition, structures located on roofs eventually will need to be disassembled and reinstalled when the life of the roof is exhausted and a new roof installed, which becomes time consuming and costly.

Ground-level or ground-based solar panels may therefore be relatively attractive. Traditional construction equipment and methods, however, typically involve heavy machinery, methods and materials that scar and disrupt the native environment—for example via disruption or extinction of flora and fauna. For example, a tracked bulldozer or back-hoe may be delivered on a large flat-bed truck, and may churn topsoil as it works. In addition, solar panel support structures have traditionally been secured to the ground using large concrete footings. Both the footings, and the equipment and processes used to make such support structures, disrupt and often ruin the native environment.

Moreover, panels and panel arrays may limit the use of the ground or structure beneath. In some cases, for example, arable land has been decommissioned from productive use due to the excessive shade created by solar panels and their mounting structures being positioned in contact with the ground.

SUMMARY OF THE EMBODIMENTS

In a first embodiment, there is provided a yoke for mounting a solar panel or solar panel cluster to a spline on a solar panel mounting structure. The yoke includes at least a base portion, with a panel mounting frame coupled to the base portion, and arm portions coupled to the base portion and arranged to movably engage the spline, along with at least one solar panel mounted to the panel mounting frame.

In some embodiments, the panel mounting frame includes a base bracket and a panel bracket. In various embodiments, the base bracket is fixedly attached to the base portion. In some embodiments the panel bracket is rotatably coupled to the base bracket. In some embodiments, the panel bracket includes notches to engage a solar panel.

In various embodiments, the base portion has at least one securing arm extending around the circumference of the spline, while in some embodiments the at least one securing arm is a U-shaped member secured to the base portion, such that an inner surface of the U-shaped member forms an aperture with a surface of the base portion. In various embodiments, the base portion includes at least one pair of opposing securing arms that together encircle at least a portion of the spline.

In some embodiments, distal ends of the securing arms extend to encircle a portion of, but less than the entirety of, the spline, and in some embodiments, the distal ends of the securing arms comprise a gap wider than a dimension of a pole supporting the spline, so as to allow a carriage to move along the spline past the supporting pole. In some embodiments, the at least one securing arm and the base portion encircle the entire circumference of the spline.

In another embodiment, there is provided a mounting structure for supporting one or more solar panels above the ground with minimal negative environmental impact. The structure includes at least one pole having a bottom end penetrating the ground, and a top end extending above the ground, the at least one pole secured in the ground without a concrete footing. Such a structure also includes a spline mounted to the at least one pole, a yoke releasably secured to the spline such that the yoke may be released, moved to a different location along the spline, and re-secured to the spline, without being removed from the spline, and at least one solar panel mounted to the yoke, such that the yoke is movable along the spline so as to be relocateable, and so as to controllably moderate the amount of sunlight reaching the ground adjacent to the structure.

Some embodiments have a plurality of poles, and the spline is supported by at least two poles.

Some embodiments include a plurality of yokes, and a corresponding plurality of solar panels mounted to the plurality of yokes.

In some embodiments, the at least one pole includes a body portion having an outer surface, and a length extending between the top end and the bottom end, and a cross-section normal to the length, and at least one fin projecting outwardly from the outer surface, the at lease one fin having a width and a length, the length parallel to the length of the pole, and a tapered end, the tapered end tapering towards the bottom end of the pole. Some embodiments have a plurality of fins spaced equidistant from each other around a perimeter of the cross-section of the pole. In various embodiments, the ground is arable land.

In another embodiment, there is provided a structure for supporting a solar panel above a surface, which includes at least one pole, each of the at least one poles having an axis along its longest dimension, a top end, and a bottom end, the bottom end capable of penetrating the surface; a rigid spline coupled to the top end of the at least one pole, the spline having a length and a non-circular cross-section perpendicular to the length, and a yoke releasably coupled to the spline, and at least one solar panel mounted to the yoke.

In some embodiments, the cross-section of the spline has a height and a width, the height equal to the width, such that the cross-section of the spline is a square, and in other embodiments, the cross-section of the spline has a height and a width, and the height is not equal to the width, such that the cross-section of the spline is a rectangle.

In some embodiments, the longest dimension of the cross-section of the spline is perpendicular to the axis of the at least one pole. In various embodiments, the longest dimension of the cross-section of the spline is parallel to the axis of at least one pole. In some embodiments, the cross-section of the spline is not a quadrilateral. In some embodiments, the cross-section of the spline is triangular, and in some embodiments, the cross-section of the spline is circular, and in some embodiments, the cross-section of the spline is a conic section.

In some embodiments, the at least one pole has a diameter of 4.5 inches or less, and in some embodiments the at least one pole has a diameter of 4 inches or less.

In another embodiment, there is provided a method of forming a solar panel support structure, including at least the steps of setting at least one pole into the ground; coupling a spline to the at least one pole; coupling at least one yoke to the spline; and coupling at least one solar panel to the yoke, wherein the at least one pole is not embedded in concrete.

In some embodiments, the at least one yoke comprises two yokes coupled to one solar panel. In some embodiments, the step of coupling at least one yoke to the spline includes at least releasably securing at least one yoke to the spline such that the at least one yoke may be released, moved to a different location along the spline, and re-secured to the spline, without being removed from the spline.

In some embodiments, the method also includes providing a cap between the pole and the spline.

In some embodiments, the at least one pole includes at least two fins, and step of setting at least one pole into the ground includes placing the fins below ground level. In some embodiments, the at least two fins are in direct contact with the ground.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

The structures and methods described below enhance the utility and economic viability of solar arrays by providing flexibility in the positioning and orientation of one or more solar panels. Such flexibility allows solar panels to be placed, moved, positioned, and reoriented to adapt to varying environmental conditions and changing needs. Various embodiments also provide a sturdy and robust mounting system, thereby enhancing the utility and reliability of a solar array.

In addition, methods of constructing various embodiments of a solar array employ environmentally friendly materials, methods, and equipment, to mitigate the environmental impact of both the construction of solar arrays, and of the solar arrays themselves. Components of the mounting structure may include materials that are readily available and easy to work with, and may be economically fabricated away from the installation site (i.e., off-site) and delivered to the site for final assembly of the mounting structure.

Individually and collectively, these features reduce the undesirable environmental impact of conventional solar arrays, and make them more attractive and affordable to potential users.

Figure 1A:
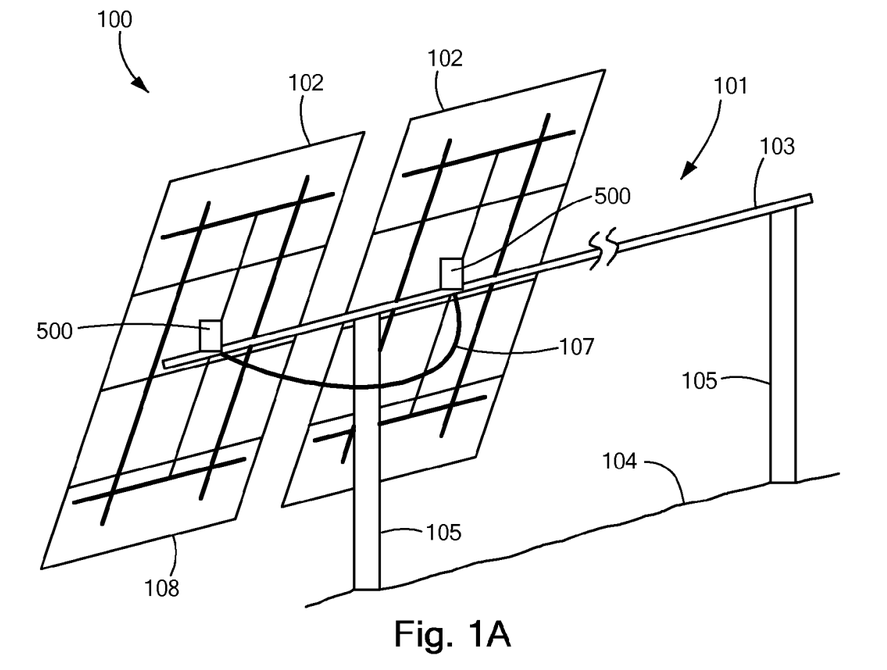
FIG. 1A schematically illustrates a segment of a solar array.

To these ends, a segment 101 of a solar array 100 is schematically illustrated in FIG. 1A. Such an array 100 may include one or more segments 101, each segment capable of supporting one or more solar panel clusters 102 above the ground 104 or other surface. As schematically illustrated in FIG. 1A and FIG. 1B, the solar arrays 100 and 120 support one or more solar panel clusters with a single spline 103.

The segment of solar array 101 illustrated in FIG. 1A has two solar panel clusters 102, each supported by a yoke 500. Each yoke 500, in turn, is movably attached to a spline 103 suspended horizontally between two poles 105. Because the yokes 500 are movable, the solar panel clusters 102 may be moved to any desired position along the spline 103, either within the illustrated segment, or to an adjacent segment in the array 101 or 120. As such, each solar panel cluster 102 may be selectively located at, or relocated to, a desired position along the spline 103. In this way, panel clusters 102 may be moved to a location of maximum solar radiation, for example, or simply moved for any purpose. Among other things, if a panel cluster 102 is part of a multi-panel array 101, or array 120 as in FIG. 1B, the spacing of the panel clusters may be adapted to adjust the amount of light reaching the ground 104 beneath the panel cluster 102. This may be desirable, for example, if the crops growing below the array are changed, or in response to an increase or decrease in sunlight due to changing seasons.

A solar array may include any number of segments 101, such that the spline may be as long as desired. For example, FIG. 1B schematically illustrates three segments 121, 122, 123 of a multi-segment solar array 120, each segment supporting at least one solar panel cluster 700.

Figure 1B:
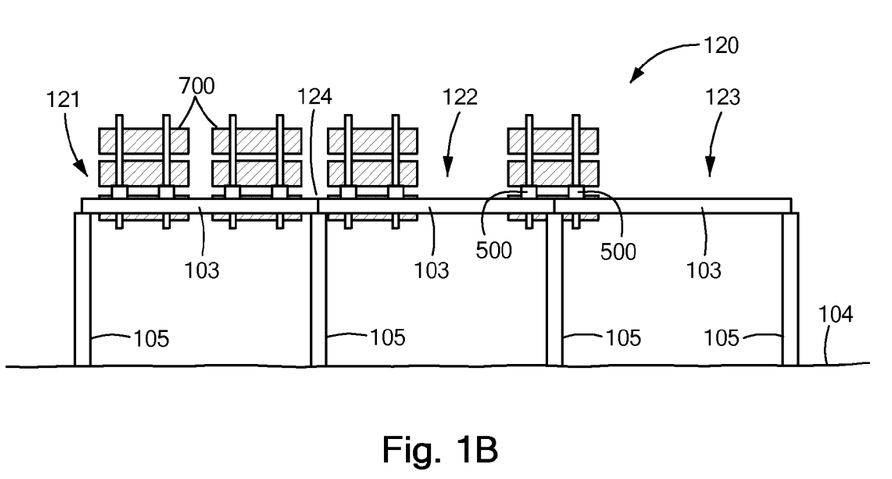
FIG. 1B schematically illustrates several segments of a solar array.

Although the arrays of FIGS. 1A and 1B are illustrated as being on flat, level ground 104, various embodiments may be supported on sloped or uneven ground, and may even pass over obstructions such as trenches, roads or other features of the local landscape.

Various features of illustrative embodiments may be readily illuminated by describing embodiments of the steps involved in the construction of such an illustrative array 120. During construction, equipment and materials may be brought in as they are needed, or they may be positioned on-site prior to beginning construction. Further, some components may be pre-fabricated off-site to facilitate ease of assembly during, and reduce the cost associated with, construction. In the construction process 800 described below and in FIG. 8, materials and equipment are assumed to be available at the times and in the places where they are needed.

A. Setting Poles

Figure 8:
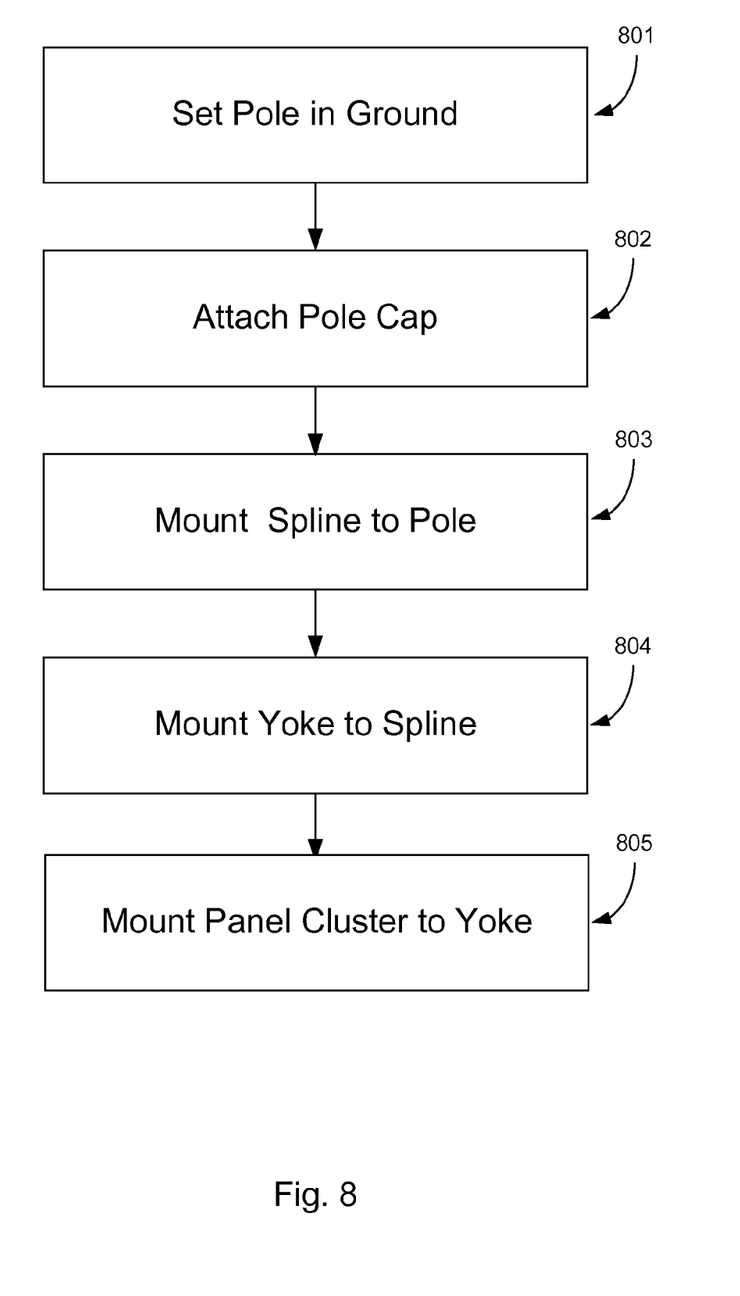
FIG. 8 is a flow chart illustrating a construction method.

The first step 801 in the construction process 800 involves planting one or more supporting poles 105 into the ground 104 or other surface on which the array 120 will stand. Illustrative embodiments have two or more such poles 105, and suspend one or more sections of spline 103 between them, as described more fully below. It is understood, however, that alternate embodiments may have only a single pole, so as to form a "T" shaped array-mounting structure for example.

As illustrated in FIG. 1B, the poles 105 may be set vertically into the ground 104, although the setting of the poles 105 is not limited to the vertical. Other angles may be desirable, depending for example on the terrain or obstructions in the vicinity of the pole. For example, to support a spline 103 at a point above a stream, a pole 105 may be set at an angle into the bank of the stream. Indeed, a pole 105 may be set at any of a wide range of angles to the ground 104, or may even extend from an adjacent geographic feature or structure.

Poles 105 may be set into the ground 104 using any of a variety of methods. For example, a pole 105 may be driven into the ground 104 (e.g., creating its own hole as it goes), or may be planted by first digging a hole, and then filling the hole around the sub-surface end of a pole 105 placed into the hole. Soil against the fins of a finned pole (embodiments of which are described below) provides both stability and resistance against uplift load. As such, in some embodiments the poles are secured in the ground only by soil or an amalgam of soil and rock or other materials as may be found on the construction site, or even from the very hole into which the pole is set.

In some embodiments, concrete may be used to secure the pole 105 in place, although the use of concrete has negative environmental impact. For example, heavy construction vehicles would need to be brought to the construction site both to deliver the concrete, and to remove any soil from the hole in which a concrete footing is formed. A typical concrete footing of a size sufficient to secure a pole for a solar array may have a volume of 200 cubic feat (for example five feet wide by five feet long and eight feet deep). Such a large footing may take as long as 30 days to set, thus increasing the time and cost of construction. As such, the use of concrete to secure a pole would preferably be done only where the environmental impact is less critical, for example in a parking lot or over a walkway.

In an illustrative embodiment, vertical poles 105 are set in place by use of a hydraulic grappler mounted to a small skid steer loader or other available piece of hydraulic machinery, as are known in the construction arts. The pole 105 is then driven (pounded) into the ground 104 by dropping a weight repeatedly on to the top of the pole 105 until the pole reaches its desired depth. In this way, setting the poles 105 into the ground 104 disturbs the soil only minimally at the point of insertion of the pole.

In some embodiments, a protective cap may be used to protect the top of the pole 105 from being deformed during the driving process. An exemplary protective cap 130 for a pole 105 with a circular cross-section having an outside diameter is schematically illustrated in FIG. 2D, and has a sleeve 131 and a steel plate 132. The sleeve 131 has an annular or tubular shape with an inside diameter slightly larger than the outside diameter of the pole 105, so that the sleeve 131 fits over the pole 105. Steel plate 132 caps one end of the sleeve 131 and rests on the top end 108 of the pole 105. The protective cap 130 may even be temporarily secured to the top of the pole 105. Alternately, such a protective cap 130 may be secured to the sides of the pole 105 so as to distribute the driving force away from the exposed top end of the pole.

Once the pole 105 is set at its desired depth, the protective cap 130, if any, is removed and the equipment is moved to the next pole location. Additional poles 105 may be set in the ground 104, as determined by the design of the array 120, until a row of poles 105 is completed. If the design of the array calls for the pole tops to be at a uniform level, workers my shoot the top of the poles with a leveling transit.

Equipment used to set the poles 105 and perform other construction activities is preferably selected to minimize its environmental impact. For example, vehicles with pneumatic tires exert less intense compression or "soil/plant disruptive" forces on the surrounding ground, and therefore cause less disruption to the ground than tracks found on typical construction equipment such as bulldozers, backhoes and other earth-moving equipment. Similarly, using biodegradable hydraulic oil, such as some vegetable oils, in construction equipment will mitigate potential damage from conventional petroleum based hydraulic fluid leaks that may occur. Further, since many solar arrays will have an interconnection to a power company's electrical grid, electric vehicles and equipment may be used instead of their petroleum-powered counterparts to further reduce the environmental impact of construction activities. These design approaches tend to reduce construction disruptions to the host client and are part of the process that reduces installation costs.

The poles 105 will have a variety of physical attributes, some of which may vary depending on the design of the solar array 120 and the site chosen for its installation. The ability to specify some of these attributes is within the ordinary skill of an engineer in the construction arts.

Among other things, the poles 105 should have strength sufficient to bear any anticipated load, including the weight of the splines 103 and solar panels 700 as described further below, as well as any stresses induced by the location and relocation of the solar panels 700. Further, the poles 105 should have strength sufficient to withstand any environmental loads, such as snow load, live load, and wind load, to name a few. The environmental conditions and anticipated loads to be addressed will vary as a function of the design and location of the solar array, and must be assessed by the array's designer.

In addition, the pole 105 must be tall enough to provide ground clearance for its solar panels 700. For installations that permit dual use of the land beneath and around a solar array 120 (that is, a use in addition to supporting the solar array), the poles 105 must be tall enough to permit another desired use of the land to occur beneath or around the array.

For example, if the land 103 beneath and around a solar array 120 is arable, the poles should be tall enough to hold the solar panels 700 above the ground 104 at an elevation sufficient to allow a desired amount of sunlight to reach the growing plants (or if the maximum available sunlight is less than the desired amount, then the poles should be tall enough to allow some sunlight to reach the growing plants), and/or to allow farm personnel and equipment to work around and beneath the solar panels 700. The height and/or spacing configuration of the array required to pass the desired amount of sunlight will depend, among other things, on the crop being grown (since not all plants have the identical needs for sunlight), as well as the season and the latitude of the solar array on the Earth's surface (since those factors affect the amount of sunlight incident in the area of the array). Similarly, if a road or parking lot is beneath the solar array 120, the poles 105 should be tall enough to permit vehicle traffic beneath the array.

Figures 2A, 2B, 2C:
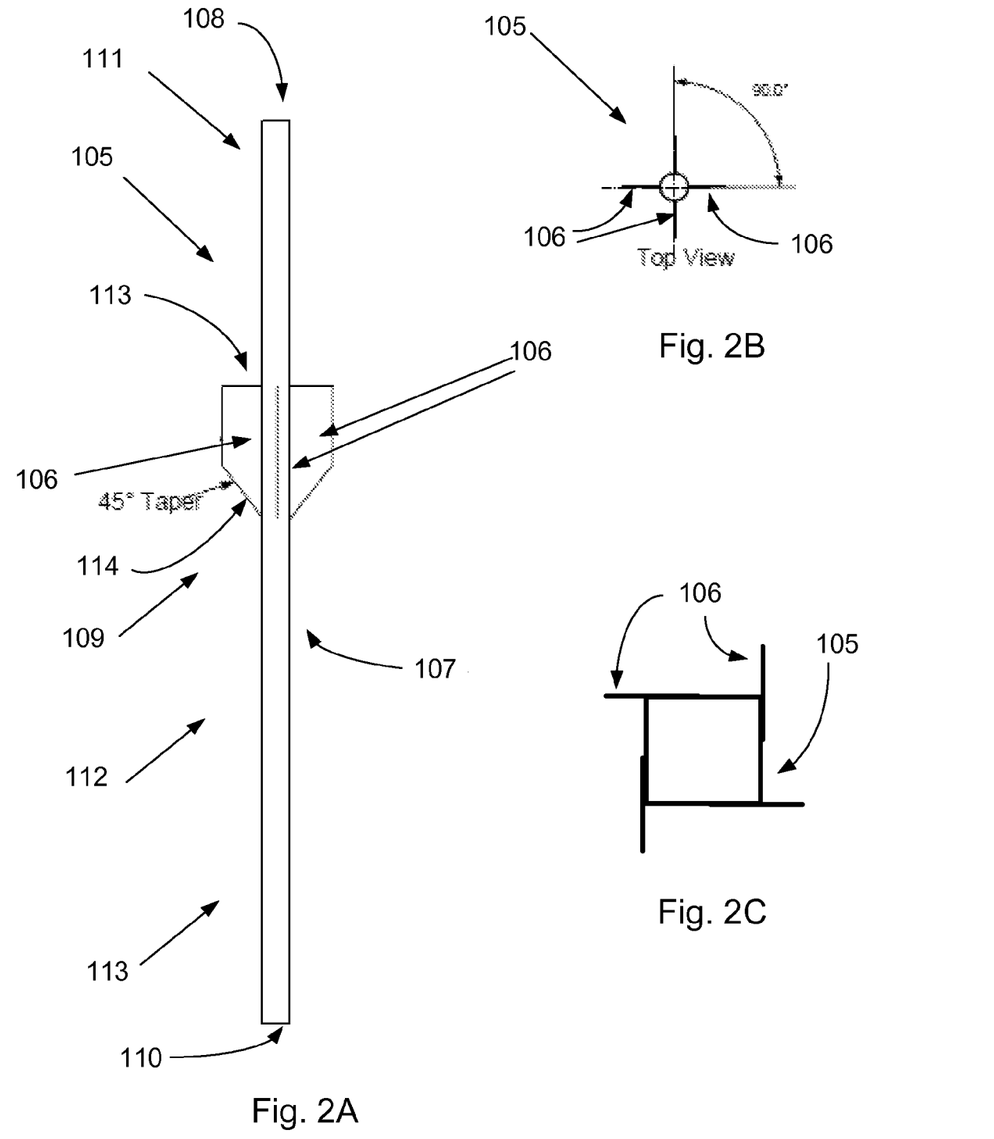
FIGS. 2A, 2B and 2C schematically illustrate embodiments of a finned pole.
Figure 2D:
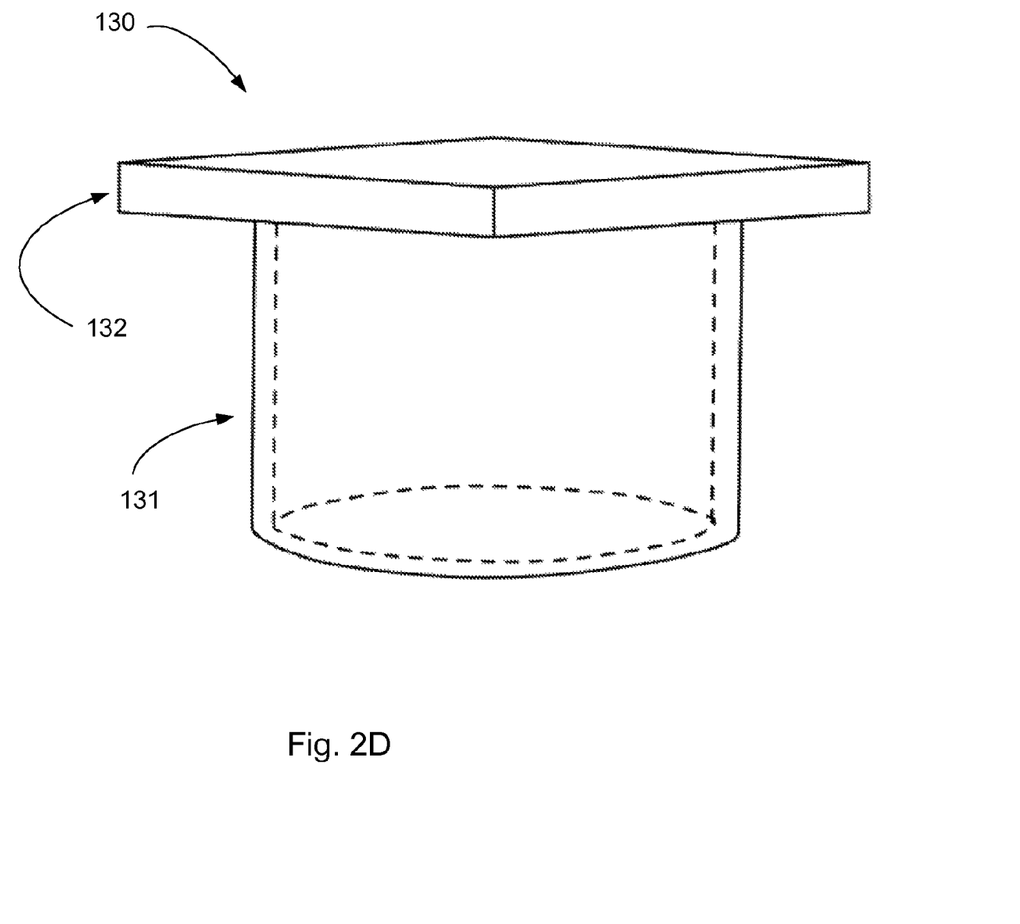
FIG. 2D schematically illustrates an embodiment of a protective cap.

To those ends, a pole 105 may have one of a variety of shapes and sizes, as illustrated in FIGS. 2A, 2B, and 2C. Each pole 105 has a length, the length being the longest dimension of the pole. When set into the ground, the length of a pole 105 will determine the elevation of the top end of the pole above the ground 104. In the embodiment of FIG. 2A, pole 105 has a length of 17 feet, but pole length may be different as dictated by the specific needs and details of various installations.

In addition, each pole 105 will have a width or diameter, depending on the shape of the cross-section of the pole in a plane perpendicular to its length. Those dimensions may determine, among other things, the strength of the pole, as well as its lateral stability. In the embodiment of FIG. 2A, pole 105 is a steel pipe with a six inch outside diameter.

Some embodiments of a pole 105 include one or more fins 106 extending from the outer surface 107 of the pole 105, as schematically illustrated in FIG. 2A. The inventor has discovered that fins 106 increase the strength and lateral stability of a pole 105 when set in the ground 104. Indeed, in some embodiments a six-inch diameter round pole with three or four fins (for example, on various sides of the pole) provides substantially the same strength and stability of a twelve-inch diameter pole without fins, while using less material (e.g., less steel in the smaller pole) at less cost. In addition, a smaller pole-diameter is easier to drive into the ground, and causes less disruption to the soil. Similarly, an eight-inch diameter pole with fins may provide substantially the same strength and stability as a sixteen-inch diameter pole without fins.

In addition, fins may increase the uplift resistance of a pole. A pole supporting solar panels may be subject to an upward, lifting force, such as when winds act on a solar panel. This is in contrast to prior art poles used for holding things up, in which the concern is only the strength of the pole and its ability to hold something above a surface.

Such forces may be known as "uplift" forces, and a pole may be described by its ability to withstand an "uplift load" (or "gross ultimate uplift load") in a direction that tends to urge the pole out of the ground. Such forces and action may damage or weaken a structure by urging a pole upward, and possibly even pulling it out of the ground.

Figure 2E:
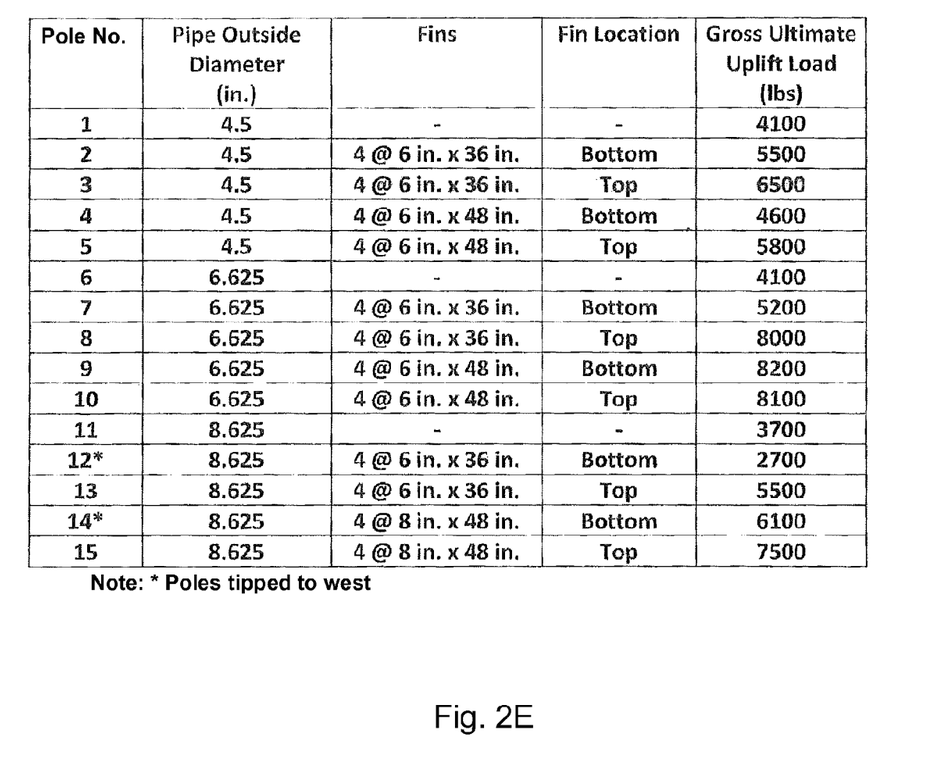
FIG. 2E is a table of uplift load data for various finned and un-finned poles.

Although it may seem counterintuitive, in some embodiments a smaller (e.g., smaller diameter) pole may provide greater uplift resistance than a relatively larger pole. For example, and shown in the data in FIG. 2E, a pole with an outside diameter of 4.5 inches, and having four 6×36 inch fins in an area of the pole near the surface of the ground, provides a gross ultimate uplift load of 6,500 pounds (Pole No. 3). In other words, a force of 6,500 pounds would be required to pull the pole vertically out of the ground. In contrast, a relatively larger pole with a diameter of 8.625 inches, with the same fin arrangement, provides a gross uplift load of only 5,500 pounds (Pole No. 13). The inventor believes that a pole can resist winds of up to 100 miles per hour if it can withstand a gross uplift load of 2,500 pounds, but to provide a margin of safety some embodiments use poles that can withstand a gross uplift load of 5,000 pounds. Thus, some embodiments use finned poles with an outside diameter of 4.5 inches or less. Indeed, some embodiments use finned poles with an outside diameter of less than 4 inches. Of course, the poles need not be round, and similar results may be provided by poles with non-round cross-sections.

In the embodiment of FIG. 2A, the fins are located near the center portion of the pole 105. The location of the fins 106 on the pole 105 may be important because in some embodiments the top of the fins should be at, or just below (for example, one or two inches), the surface of the ground when the pole 105 is implanted. To that end, the pole 105 may be described as having a top end 108, a bottom end 110, and a body portion 109. The body portion may be considered as having three portions—a top quarter 111 that includes the top end 108, a bottom quarter 113 that includes the bottom end 110, and a center portion 112 that includes the half of the pole 105 between the top quarter 111 and bottom quarter 113. In the embodiment of FIG. 2A, therefore, the fins 106 extend from the center portion (middle section) of the pole. In the embodiment of FIG. 2A, the fins 106 are half-inch thick steel, thirty inches (two feet, six inches) in length, and eight inches wide, while in an alternate embodiments the fins may be $3/8$ inch thick steel, thirty-six inches (three feet) in length, and six inches wide. The top ends 113 of fins 106 meet the surface 107 of pole 105 at a ninety degree angle (i.e., normal to the surface 107 of pole 105), at a distance of five feed from the top end 108 of the pole 105. These dimensions are illustrative only. Persons of skill in the art may readily adapt the dimensions to suit any particular need.

A pole 105 may have any number of fins 106, including for example, one fin, two fins, or three or more fins. The number, arrangement and dimensions of the fins 106 may ultimately depend on the size of the solar array 120, its height and number of panel clusters, as well local environmental conditions (e.g., wind and snow loads), and even the qualities of the ground 104 into which the pole will be set. For example, a tall pole 105 may have more and/or larger fins 106 than a shorter pole of the same diameter. A pole supporting several solar panels 700 may have more and/or larger fins 106 than a smaller pole. Similarly, a pole 105 set in light or loosely packed soil 103 may have more fins 106 than a similar pole set in heavy, compact soil. Some embodiments have several fins spaced equidistant from each other around a perimeter of a cross-section of the pole.

The fins 106 themselves may have a variety of shapes and sizes. In the embodiment of FIG. 2A, the fin 106 is made of half-inch thick steel, and is 30 inches in length and 8 inches wide. The length of the fin 106 extends towards the bottom end 110 of the pole 105, parallel to the length of the pole 105.

The top end 113 of fin 106 meets the surface 107 of the pole 105 at a ninety degree angle. In contrast to the top end 113 of the fin 106, the bottom end 114 of the fin 106 is tapered at a forty-five degree angle. While such a taper is not necessary, it facilitates the driving of the pole 105 into the ground. Simply put, the taper allows the fin 106 to more easily penetrate into the ground 104. Other taper profiles may also be used. For example, instead of a straight taper at forty-five degrees, a taper could be a concave or convex curve.

A pole 105 may have any of a variety of cross-sections perpendicular to its length. Round poles (i.e., poles with a circular cross-section, as in FIG. 2B) are readily available, and may be less expensive than non-round poles. Also, a round pole is generally easier, and therefore less expensive, to drive into the ground. Nevertheless, poles with non-circular cross-sections may be used. For example, a pole may have a cross-section in the shape of a conic section such as an ellipse, or in the shape of a quadrilateral (or quadrangle) such as a square or rectangle.

A rectangular pole 105 with fins 106 is schematically illustrated in FIG. 2B, in which a flat surface of the fins (i.e., not an edge) are attached to a side of the pole 105, such that the fin 106 meets the pole 105 with more surface area than the edge connection of pole 105 in FIG. 2A, thus potentially providing a stronger connection.

B. Installing the Pole Cap

Figure 3A:
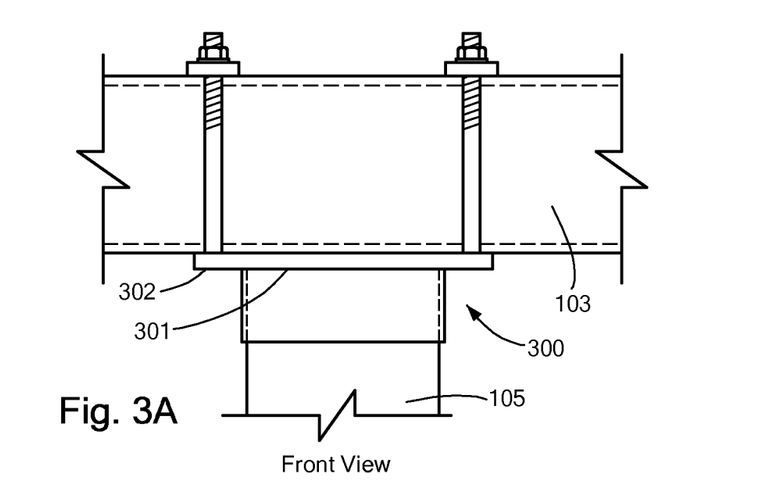
FIGS. 3A, 3B and 3C schematically illustrate isometric views of a pole cap and spline.
Figure 3B:
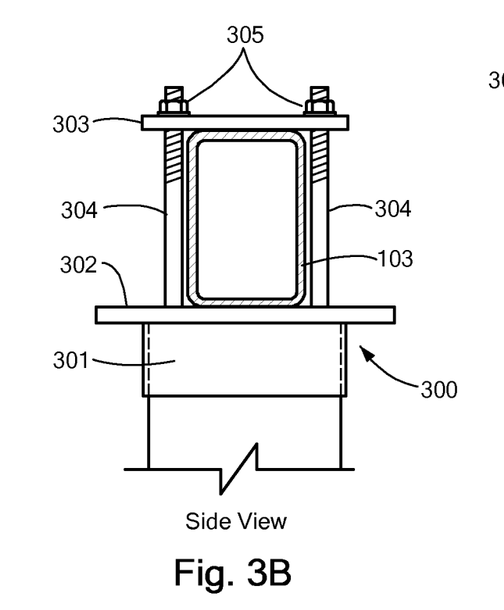
Figure 3C:
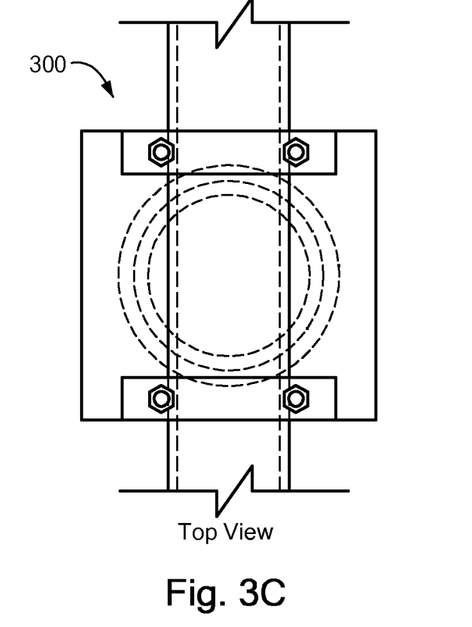

In illustrative embodiments, pole caps are mounted to the top of each pole after the pole is set (step 802), although in other embodiments the pole cap may be attached before the pole is set. One embodiment of a pole cap 300 on a pole 105 with a rectangular spline 103 is schematically illustrated in FIGS. 3A-3C.

In this embodiment, the cap 300 has a collar 301 that fits over the top of the pole 105, and a supporting plate 302 that supports the spline 103. In FIG. 3A, the collar is a length of three-eighth inch thick steel pipe with a six and five-eights inch diameter, and an inside diameter large enough to fit over pole 105. In alternate embodiments the collar may be half-inch thick steel pipe. Initially, the cap 300 is set on top of the pole 105 loosely (i.e., not secured to the pole), solely for the purpose of having a place to rest the spline 103 as it is installed. Some embodiments include shooting the cap 300 with a transit from pole to pole to ascertain level. Indeed, some caps may have an adjustable supporting plate that is movable with respect to the collar and pole, so that it may be leveled when set on the pole.

When the cap 300 is in the desired position, it may be welded, bolted, or otherwise secured to the top of the pole 105. As such, the cap 300 is positioned to provide connection between the pole 105 and the spline 103.

C. Mounting the Spline

After the poles 105 and caps 300 are in place, the spline 103 is mounted (step 803). The spline 103 is rigid to support the solar panels 700, and to that end, the spline may be made of steel, or other rigid material. Each section of the spline 103 is also straight to allow the solar panels 700 to be easily relocated along the length of the spline 103, as discussed in more detail below.

The spline 103 has a long axis, and a cross-section perpendicular to that axis. In cross-section, the spline 103 may be a quadrilateral (such as a square or rectangle) or a conic section. A three-sixteenths inch thick steel spline 103 with a four-inch by six-inch rectangular cross-section is schematically illustrated in FIG. 3A. In alternate embodiments, the spline may have a thickness of one-quarter inch. As illustrated in FIG. 1A, FIG. 1B and FIG. 3A, the length (long axis) of the spline 103 is greater than its four-inch width or its six-inch height.

During construction, a section of spline 103 is placed on the caps 300 of two poles 105 and temporarily secured with U bolts. To that end, the spline is sandwiched between a support plate 302 and a cap plate 303, as schematically illustrated in FIG. 3B. A number of threaded bolts 304 extend from the support plate 302, past the spline 103, and through apertures in the cap plate 303. Fasteners 305 secure the cap plate 303 to the bolts 304, effectively securing the spline 103 to the pole 105.

This approach serves two purposes: it helps level the joints of the splines, and it helps keep workers safe from an unsecured spline 103 being knocked off a pole 105 during the alignment process.

As illustrated in FIG. 1B, some embodiments include several sections of spline 103, which together make a longer run of spline. Once a run of the spline 103 is in place, the process may include leveling and straightening any deflections, such as at the interface 124 of two spline segments. When the spline 103 is in the desired position, the caps 300 and spline 103 may be permanently welded in place. Once the welding is completed the U bolts may be removed and reused for the next segment.

Figure 4A:
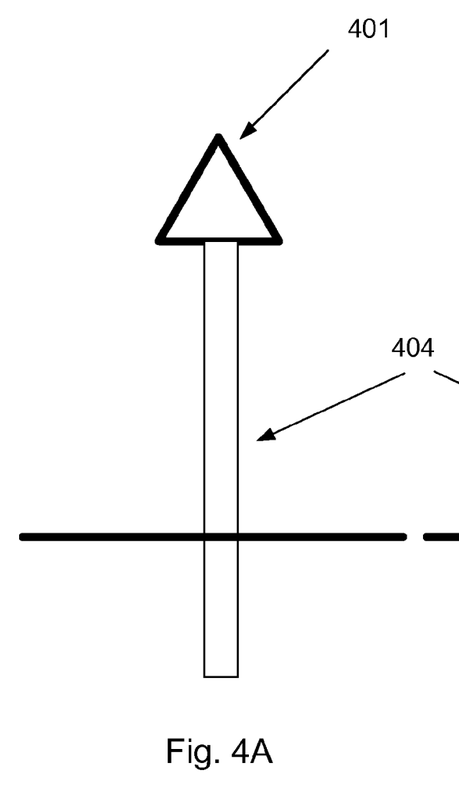
FIGS. 4A, 4B and 4C schematically illustrate alternate splines.
Figure 4B:
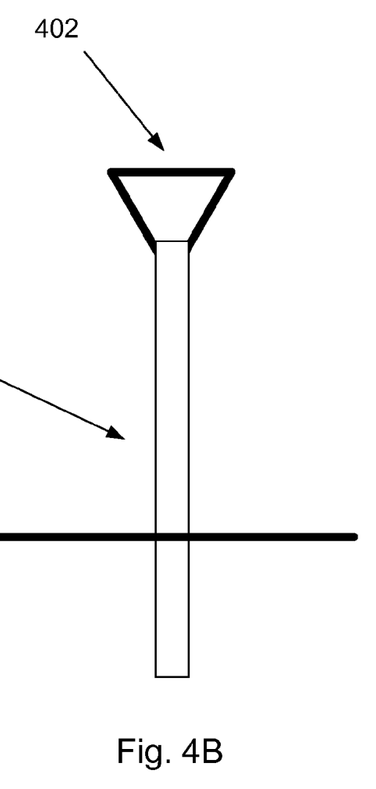

In some embodiments, the pole may couple to the spline by fitting into an aperture in the spline (see, for example, FIG. 4A and FIG. 4B in which the pole 404 may fit into an aperture in spline 401 or spline 402).

The shape of the cross-section of the spline 103 may provide advantages in supporting the yoke 500 and solar panel 700. For example, a spline 103 with a rectangular cross-section may be less prone to allowing the base member 102 to rotate around the spline 103 than, for example, a spline with a circular or square cross-section.

Figure 4C:
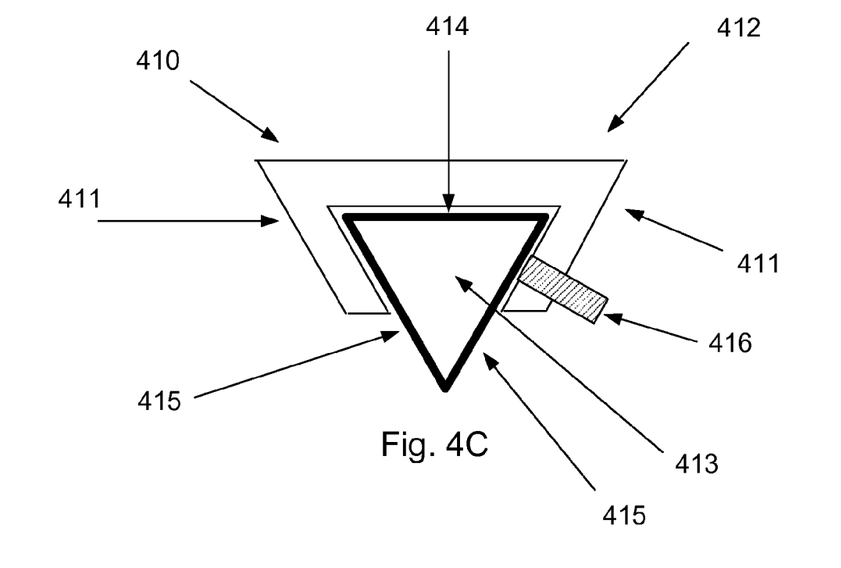

Alternate embodiments of the spline 103, may have different geometric cross-sections, such as triangular cross section, as illustrated in FIGS. 4A and 4B, for example. Triangular splines 401, 402 may use less material than a rectangular spline 103, while still providing adequate structural strength to support a yoke and solar panels. In addition, its triangular cross-section may permit a yoke to be movably mounted to the spline 401 or 402 in such a way as to easily allow a yoke to pass over the junction of the spline and one of its supporting poles 404. For example, the base member 410 and arms 411 of a yoke 412 on a triangular spline 413 are schematically illustrated in FIG. 4C. The base member 410 may slide along the surface 414 of the spline 413, while the arms 411 grasp the sides 415 of the spline. One or more bolts 416 through the arms 411 may releasably hold the arms 411 and base member 410 to the spline 413. To move the yoke 412, bolt 416 may be loosened so that the yoke 412 is movable with respect to the spline 413, and yet is not (and need not be) completely removed from the spline 413. The bolt 416 may then be re-tightened after the yoke 412 has been moved, to re-secure the yoke 412 to the spline 413.

D. Mounting the Yokes

When the spline is affixed to the pole, one or more yokes may be mounted to the spline (step 804). As schematically illustrated in FIG. 1A, each panel cluster 102 in the array is movably supported from a spline 103 by a yoke 500, although in some embodiments each solar panel cluster may be supported by two or more yokes, as schematically illustrated by panel clusters 700 in FIG. 1B.

Figure 5A:
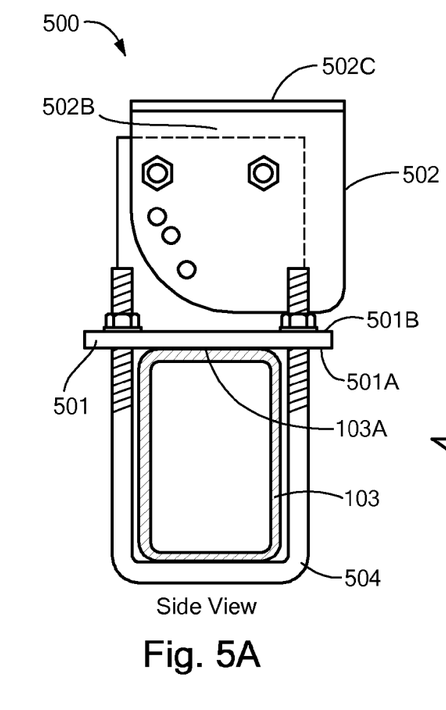
FIGS. 5A, 5B and 5C schematically illustrate schematically illustrate isometric views of a yoke.
Figure 5B:
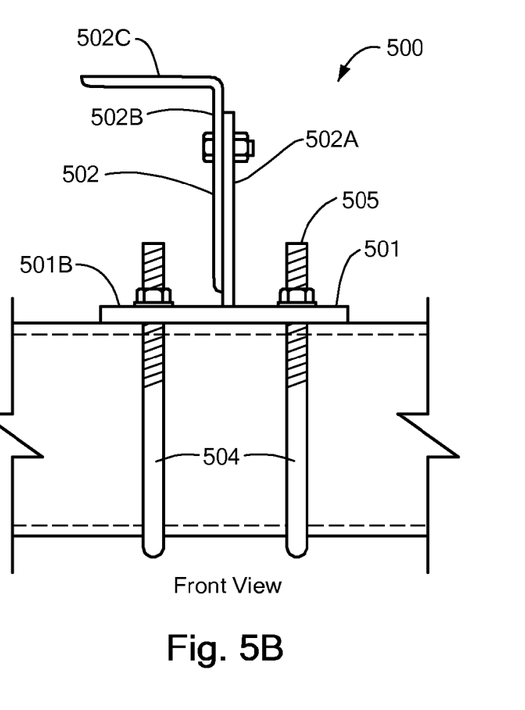
Figure 5C:
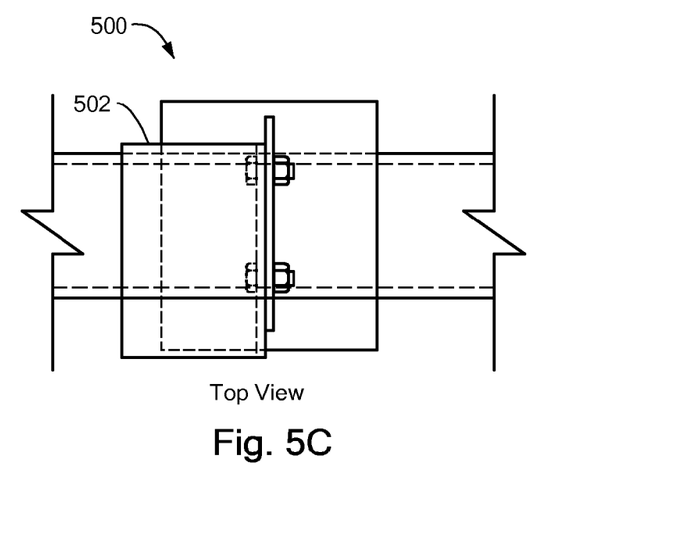

An exemplary yoke 500 is schematically illustrated by three isometric views in FIGS. 5A-5C. The yoke 500 is releasably secured to the spline 103. As used herein, the term "releasably secured" (or "releasably mounted" or "releasably coupled") means that in a secured state the yoke can be coupled to the spline (for example, using components of the yoke) such that the yoke is effectively immobilized with respect to the spline, and in a movable state the yoke may be made movable with respect to the spline without being removed from the spline. In some embodiments, a yoke may move or be moved along the spline, while still coupled to the spline in such a way that the yoke could not be removed from the spline (for example, if arms 504 in FIG. 5A are sufficiently loose to allow the yoke 500 to move along the spline 103, the arms 504 still encircle the spline 103, and thus would prohibit the removal of the yoke 500 from the spline 103). In any case, a releasably secured yoke may be moved and re-secured multiple times. A yoke that may be released and re-secured may be described as being movably engaged with the spline. Similarly, portions of a yoke that engage a spline may be said to movably engage the spline.

As such, the yoke 500 is movable with respect to the spline 103, and is thereby movable with respect to the ground 104 or other structure on which the spline 103 is based. As such, each solar panel cluster 700 may be selectively located at, or relocated to, a desired position along the spline 103. In this way, panel clusters 700 may be moved to a location of maximum solar radiation, for example, or simply moved for any purpose. Among other things, if a panel cluster 700 is part of a multi-panel array 120, the spacing of the panels may be adapted to adjust the amount of light reaching the ground 104 beneath the panel cluster 700. This may be desirable, for example, if the crops growing below the array are changed, or in response to an increase or decrease in sunlight due to changing seasons.

The yoke 500 includes a base member 501 and a mounting bracket 502. In this embodiment, the base member 501 includes a flat plate with two major surfaces. A first major surface 501A rests on a surface 103A of the spline 103. As such, the first major surface 501A may move or slide along the opposing surface 103A of the spline, thus allowing the panel cluster (not shown) to move along the spline 103 as well.

The mounting bracket 502 is affixed to the second major face 501B of the base member. In this embodiment, the mounting bracket 502 has three members—two that are movable with respect to one another, and one that engages a solar panel cluster. In alternate embodiments, however, the mounting bracket may be a unitary member.

In FIGS. 5A, 5B and 5C, the members that are movable with respect to one another may be known as a base bracket 502A and a panel bracket 502B. The base bracket 502A and a panel bracket 502B may allow the angle of the solar panel to be adjusted relative to the base member 501, to adapt to the location of the sun for example. In FIGS. 5A-5C, the base bracket 502A and panel bracket 502B are three-eighth inch thick steel, and the panel bracket is approximately four by six inches in dimension. In alternate embodiments, the base bracket 502A and panel bracket 502B are half-inch thick steel.

Some embodiments include a sensor to detect the position of the Sun relative to the panel cluster, and an associated motor to adjust the position of the panel bracket 502B relative to the base bracket 502, so as to orient the panel cluster to the Sun. Such a sensor, and or the motor, may draw power from the panel cluster itself, or from batteries associated with the base member, or from an external power source.

The mounting bracket 502 has a top surface 502C to attach a panel support frame 600 (FIG. 6A), which is the third member of this exemplary mounting 900 bracket. In FIGS. 5A and 5B, top surface 502C is at a 90 degree angle to the other portion of panel bracket 502B, but other embodiments may have other angles, or no angle at all, depending on the solar panels to be mounted to the mounting bracket 520. The flat surface 502C allows a variety of panel support frames to be attached to the yoke 500, to accommodate a variety of solar panels.

The panel support frame also includes notches or other physical adaptations (such as shapes 601 in FIG. 6A) to engage corresponding features on a solar panel, so as to physically couple the solar panel to the base.

In some embodiments, the panel mounting frame bears a fixed spatial relationship to the base member 501, while in other embodiments the panel mounting frame is rotatably coupled to the base member 501, for example by a base bracket 502A and a panel bracket 502B as described above.

Two U-shaped arms 504 extend from the base member 501. Together, the inside surface of the U-shaped arms 504, along with the first surface 501A of the base member 501, encircle the circumference of the spline 103. As such, the base member 501, and indeed the panel cluster that it supports, is movably mounted to the spline 103.

The U-shaped arms 504 are adjustable relative to the base member 501, so that the circumference of the aperture formed by the inside surface of the U-shaped arms 504 and the first surface 501A of the base member 501 may be enlarged or reduced.

When the solar panel cluster 102 is in its desired position, U-shaped arms 504 may be adjusted relative to the base member 501 to reduce the circumference of the aperture and thereby constrict the arms 504 tightly around the spline 103, temporarily securing the base member 501 to the spline 103. In FIG. 5B, the arms may be tightened and loosed by adjusting bolts 505. When it is time to move the panel cluster 102, the U-shaped arms 504 may be loosened, so that the base member 501 can move or slide along the spline 103, but without removing the base member 501 (or the yoke 500) from the spline. As such, the base member 501 is releasably mounted to the spline 103.

E. Attaching Solar Panel Clusters

When the yoke 500 is mounted to the spline 103, the solar panel clusters may be mounted (step 805) to the yoke. In illustrative embodiments, each solar panel cluster 700 includes a frame (which may be known as a cluster frame assembly) 108 that supports one or more photovoltaic panels, but other types of solar energy collectors may also be used. For example, some solar energy collectors use solar radiation to heat a fluid.

Figure 7:
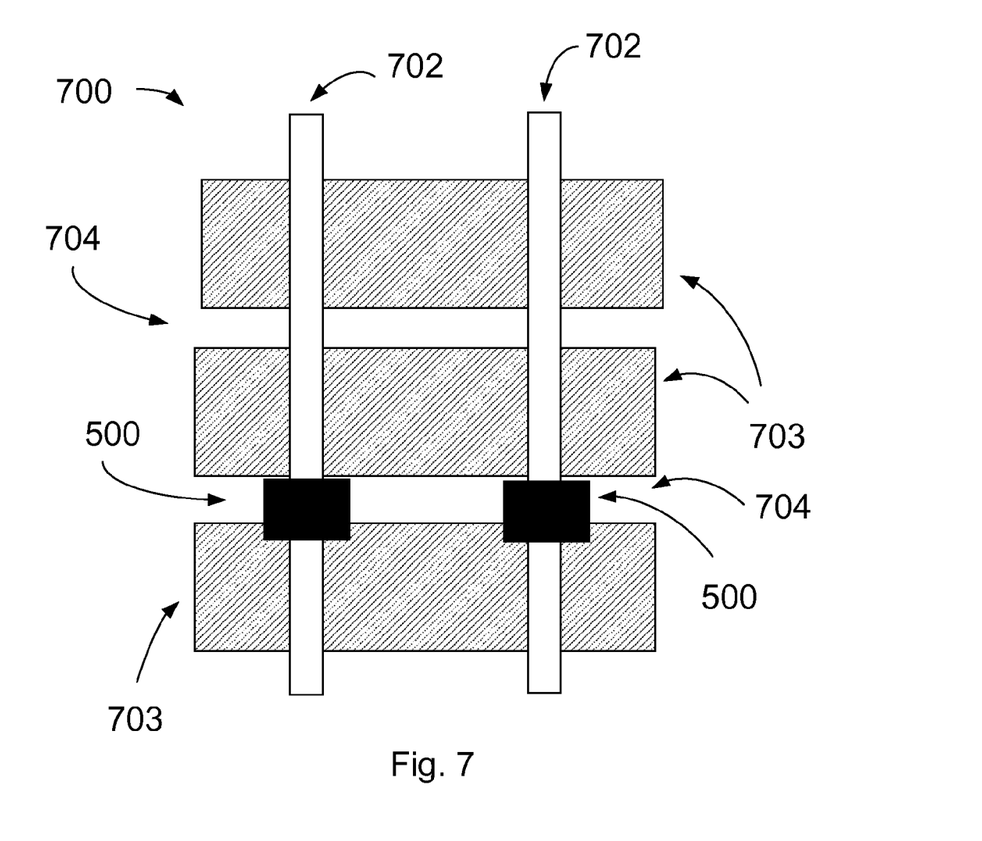
FIG. 7 schematically illustrates a solar panel cluster.

One example of a solar panel cluster 700 is schematically illustrated in FIG. 7, and includes three photovoltaic panels 703 coupled to two aluminum rails 702. In this embodiment, panels 703 serve a dual purpose—in addition to collecting solar energy, they are a structural element of the frame.

Figure 6A:
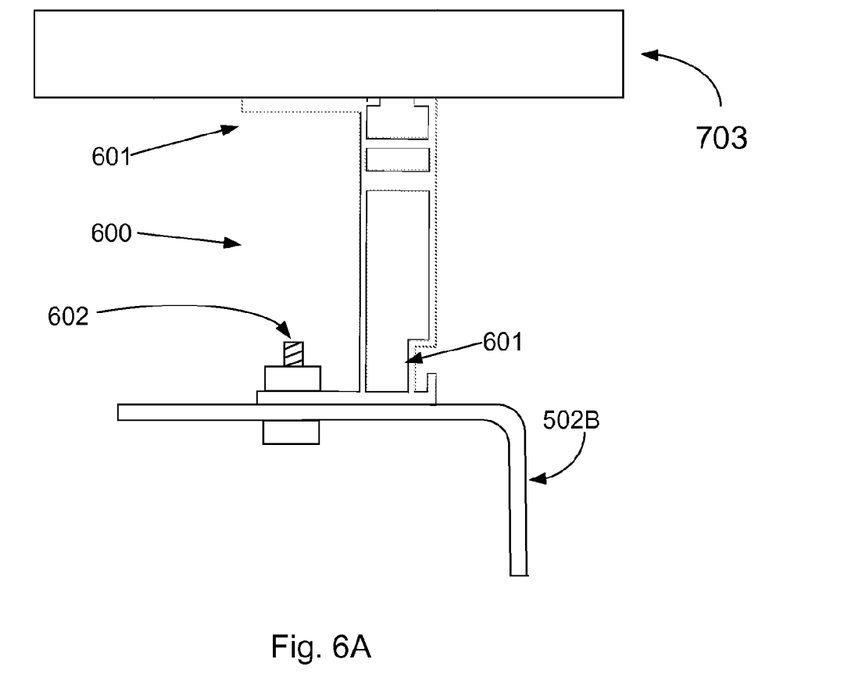
FIGS. 6A and 6B schematically illustrate embodiments of a cross-section of a solar panel support frame member.
Figure 6B:
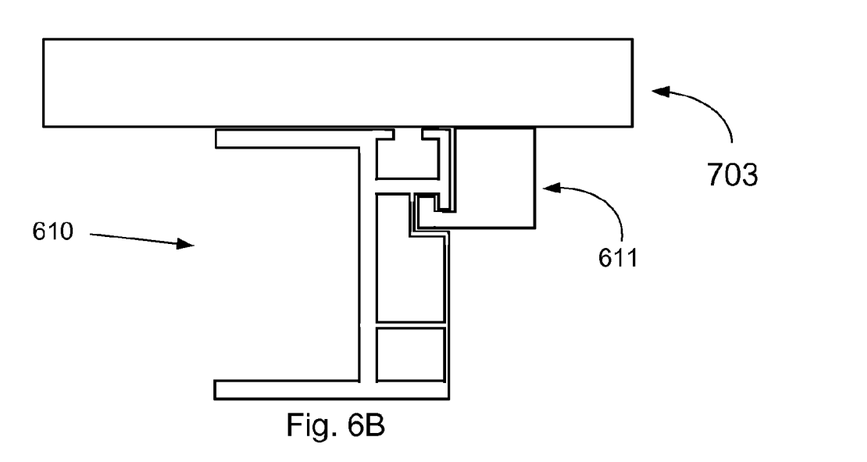

In some embodiments, the aluminum rails 702 may have a cross-section similar to rail 600 schematically illustrated in FIG. 6A, or similar to rail 610 in FIG. 6B. In general, the aluminum rails may be shaped to interconnect with or interlock with a corresponding member on a photovoltaic panel. For example, solar panels 703 may be secured to rails 600 by clips 611 designed to interlock with, and between, a solar panel 703 and a rail 600. In turn, rail 600 may mount to panel bracket 502B with a nut and bolt 602 or other fastener. In other embodiments, the aluminum rails may simply a solid, rectangular cross-section, and photovoltaic panels may simply be screwed or otherwise fastened to each rail.

The aluminum rails 702 may be custom made to length and can be preassembled off site and brought to the site with solar panels already attached, to hold down in-the-field labor costs. Alternately, the aluminum rails 702 may first be coupled to one or more yokes prior to mounting the solar panels to the rails 702. This may be desirable, for example, if the solar panels are too heavy or cumbersome for off-site prefabrication and transfer to the installation site.

In some embodiments, as illustrated in FIG. 7, there are gaps 704 between the solar panels. Such spacing is in contrast to conventional solar arrays, in which the solar panels are packed tightly together. In the solar panel cluster 700, gaps 704 span two 3 or 4 inches, allowing air and wind to pass between the panels, thereby reducing upward lift pressure on the panels 703 and panel cluster 700. That, in turn, allows the poles and spline to be smaller than they would otherwise have to be in order to withstand these forces.

In addition to providing structure to the frame, one or more of the aluminum rails may be coupled to one or more yokes 500. In the embodiment of FIG. 1A, each solar panel cluster 102 is mounted to the spline 103 by a single yoke while in other embodiments each solar panel cluster is mounted to the spline 103 by a plurality of yokes. In FIG. 1B, for example, each solar panel cluster 700 is mounted to the spline 103 by two yokes 500—one coupled between the spline 103 and each of two aluminum rail 702.

F. Making the Electrical Connection

Upon installation, the panels may be wired (per manufacturer's instructions and warrantees) to connecting points that bring electricity to a power inverter, that transforms the electricity to a voltage matching that of a utility grid, in compliance with the requirements, standards and procedures of the utility distributor servicing the site. The design of this installation process has been created to accommodate variations between utilities in this process, while retaining the simplicity and cost-effectiveness of the process. Alternately, the power output may be connected to a local load instead of being provided to the utility grid.

Some embodiments include a step of providing a galvanized coating to some or all of the exposed steel components of the structure. In other embodiments, such a coating may be applied prior to installation of the component.

The process of constructing a solar panel array may involve other concerns relating to site preparation and legal issues, for example.

To prepare the site, it may be desirable to complete six or more test pits with a geotechnical expert present to ascertain make up of soils and determine whether the site is suitable for the planned array. If the site passes soil evaluations the process may include performing a preliminary site layout to make sure the planned array is compatible with the site. If the power output of the array is to be provided to a power grid, the process may involve checking power company interconnection procedures, and ascertain whether the power company is willing and able to accept the power.

Once the site is established, local ordinances may require that construction permits be obtained before construction begins. Further, it may be necessary or desirable to work with local authorities and utilities to identify any underground utilities that might present a hazard.

As that work is ongoing, it may be efficient to prefabricate as many components as possible, off-site, to reduces costs and avoid intangible issues such as inclement weather. Then, prior to commencing construction, the construction crew or an engineer may layout the solar panel array orientation, and bring in poles, splines, caps, and other prefabricated hardware.

Various embodiments may be characterized, or alternately characterized, by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application.

Potential Claims:

P18: A structure for supporting a solar panel above a surface, the structure comprising: at least one pole, each of the at least one poles having an axis along its longest dimension, a top end, and a bottom end, the bottom end capable of penetrating the surface; a rigid spline coupled to the top end of the at least one pole, the spline having a length and a non-circular cross-section perpendicular to the length; a yoke releasably coupled to the spline; and at least one solar panel mounted on the yoke.

P19: A structure for supporting a solar panel above a surface according to claim P18, wherein the cross-section of the spline has a height and a width, and the height equal to the width, such that the cross-section of the spline is a square.

P20: A structure for supporting a solar panel above a surface according to claim P18, wherein the cross-section of the spline has a height and a width, and the height is not equal to the width, such that the cross-section of the spline is a rectangle.

P21: A structure for supporting a solar panel above a surface according to claim P20, wherein the longest dimension of the cross-section of the spline is perpendicular to the axis of the at least one pole.

P22: A structure for supporting a solar panel above a surface according to claim P20, wherein the longest dimension of the cross-section of the spline is parallel to the axis of at least one pole.

P23: A structure for supporting a solar panel above a surface according to claim P18, wherein the cross-section of the spline is not a quadrilateral.

P24: A structure for supporting a solar panel above a surface according to claim P23, wherein the cross-section of the spline is triangular.

P25. A structure for supporting a solar panel above a surface according to claim P23, wherein the cross-section of the spline is circular.

P26: A structure for supporting a solar panel above a surface according to claim P23, wherein the cross-section of the spline is a conic section.

P27: A structure for supporting a solar panel above a surface according to claim P18, wherein the at least one pole has a diameter of 4.5 inches or less.

P28: A structure for supporting a solar panel above a surface according to claim 18, wherein the at least one pole has a diameter of 4 inches or less.

Using the various components and methods described above, the inventor anticipates that a solar array having 22 poles and 70 solar panels can be constructed and put into operation in less than 2 weeks, with no appreciable impact to the ground or surrounding buildings. Using the materials and labor as prescribed may yield a cost possibly less than $5/watt.

The mounting structure and component parts described herein provide a flexible approach to building solar arrays. The elements of the mounting system itself are easily fabricated from readily available materials, and the simplicity of the design lends itself to mass production. In addition, the structure has low to no environmental impact, and may permit dual-use of the land or structure supporting the solar array.

Embodiments will enhance the quality of the environment by enabling dual-use of land—specifically, available land may be used to (i) host a solar array, while (ii) maintaining other useful applications, such as farming or nature preservation. This will increase the quantity of solar power that can be harvested because solar arrays can now be built on land previously unavailable. In addition, embodiments will enhance the quality of the environment by allowing the fabrication of ground-based solar arrays without the need for concrete footings that degrade the local environment (e.g., soil) both due to their very presence, and due to the disruption caused by the presence and use of the machinery needed for their construction (e.g., backhoe and cement truck on site). Embodiments will also contribute to the development energy resources by providing a simple, cost-effective way to fabricate and install an array of solar panels.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A yoke for mounting a solar panel to a spline in a solar panel mounting structure and supporting the solar panel above the ground, the yoke comprising:
   a base portion;
   a panel mounting frame coupled to the base portion, such that the base portion is between the panel mounting frame and the spline, the panel mounting frame further comprising a base bracket, and a panel bracket rotatably coupled to the base bracket such that the panel bracket is rotatable with respect to the panel bracket;
   at least one solar panel mounted to the panel mounting frame; and
   at least one arm portion coupled to the base portion and arranged to movably engage the spline, such that a single base portion and panel mounting frame support the at least one solar panel above the spline.

2. A yoke according to claim 1, wherein the base bracket is fixedly attached to the base portion.

3. A yoke according to claim 1, wherein the at least one arm portion comprises at least one securing arm, the base portion and the at least one securing arm together extending around the circumference of the spline.

4. A yoke according to claim 3, wherein the at least one securing arm comprises a U-shaped member secured to the base portion, an inner surface of the U-shaped member forming an aperture with a surface of the base portion.

5. A yoke according to claim 3, wherein the at least one securing arm and the base portion encircle the entire circumference of the spline.

6. A yoke according to claim 1, wherein the at least one arm portion comprises at least one pair of opposing securing arms, each of the securing arms having a base end coupled to the base portion, and a distal end, such the securing arms together encircle at least a portion of the spline.

7. A yoke according to claim 6 wherein the distal ends of the securing arms extend to encircle a portion of, but less than the entirety of, the spline.

8. A yoke according to claim 7 wherein the distal ends of the securing arms comprise a gap wider than a dimension of a pole supporting the spline, so as to allow the yoke to pass over a junction of the spline and a supporting pole.

* * * * *